United States Patent
Gupta et al.

(10) Patent No.: US 11,972,201 B2
(45) Date of Patent: Apr. 30, 2024

(54) FACILITATING AUTO-COMPLETION OF ELECTRONIC FORMS WITH HIERARCHICAL ENTITY DATA MODELS

(71) Applicant: Adobe Inc., San Jose, CA (US)

(72) Inventors: Mayank Gupta, Uttar Pradesh (IN); Mandeep Gandhi, Uttar Pradesh (IN)

(73) Assignee: ADOBE INC., San Jose, CA (US)

( * ) Notice: Subject to any disclaimer, the term of this patent is extended or adjusted under 35 U.S.C. 154(b) by 317 days.

(21) Appl. No.: 16/152,947

(22) Filed: Oct. 5, 2018

(65) Prior Publication Data

US 2020/0110795 A1 Apr. 9, 2020

(51) Int. Cl.
*G06F 40/174* (2020.01)
*G06F 16/28* (2019.01)
*G06F 40/30* (2020.01)

(52) U.S. Cl.
CPC .......... *G06F 40/174* (2020.01); *G06F 16/285* (2019.01); *G06F 16/288* (2019.01); *G06F 40/30* (2020.01)

(58) Field of Classification Search
CPC .... G06F 40/174; G06F 16/185; G06F 16/288; G06F 40/304; G06F 40/30
USPC ....................................................... 715/226
See application file for complete search history.

(56) References Cited

U.S. PATENT DOCUMENTS

| | | | |
|---|---|---|---|
| 6,651,217 B1 | 11/2003 | Kennedy et al. | |
| 7,203,699 B2 | 4/2007 | Bellamy | |
| 7,996,589 B2 | 8/2011 | Schultz et al. | |
| 8,095,476 B2 | 1/2012 | Bierner et al. | |
| 8,234,561 B1 | 7/2012 | Bourdev | |
| 10,133,813 B2 | 11/2018 | Gaither et al. | |
| 10,223,344 B2 | 3/2019 | Dakin et al. | |
| 10,614,266 B2 | 4/2020 | Dakin et al. | |
| 2002/0062342 A1 | 5/2002 | Sidles | |
| 2002/0095406 A1 | 7/2002 | McGeorge | |
| 2004/0030917 A1 | 2/2004 | Karamchedu et al. | |

(Continued)

OTHER PUBLICATIONS

Dhamankar, Robin, et al., "iMAP: Discovering Complex Semantic Matches Between Database Schemas", ACM SIGMOD, Jun. 13-18, 2004 12 pages.

*Primary Examiner* — Michael Roswell
*Assistant Examiner* — Tionna M Burke
(74) *Attorney, Agent, or Firm* — Kilpatrick Townsend & Stockton LLP

(57) ABSTRACT

In some embodiments, a computing system computes a hierarchical entity data model to facilitate autocompleting forms by generating an electronic schema extraction from an electronic form lacking data for one or more fields. The computing system generates an electronic schema including an input category and input field elements. The computing system accesses a hierarchical entity-data model including and entity category and entity-data elements. The computing system identifies associations between the entity category and input category based on semantic matching including text of an entity category label and an input field category label or matching a number of fields within an entity category to an input category. The computing system verifies the association by applying a natural language processing engine to the input field elements and the entity-data elements. The computing system autocompletes one or more input field elements with entity data from one or more of the entity-data elements.

20 Claims, 7 Drawing Sheets

(56) References Cited

U.S. PATENT DOCUMENTS

| | | |
|---|---|---|
| 2005/0289114 A1 | 12/2005 | Bellamy |
| 2006/0007189 A1 | 1/2006 | Gaines et al. |
| 2006/0161646 A1 | 7/2006 | Chene et al. |
| 2006/0200754 A1 | 9/2006 | Kablesh et al. |
| 2007/0112599 A1 | 5/2007 | Liu et al. |
| 2008/0235567 A1 | 9/2008 | Raj et al. |
| 2009/0204881 A1 | 8/2009 | Murthy et al. |
| 2010/0211863 A1 | 8/2010 | Jones et al. |
| 2011/0231409 A1 | 9/2011 | Dhara et al. |
| 2011/0258182 A1* | 10/2011 | Singh ................ G06K 9/00442 707/723 |
| 2011/0271173 A1 | 11/2011 | Ait-Mokhtar et al. |
| 2013/0198123 A1* | 8/2013 | Stadermann ....... G06K 9/00463 706/46 |
| 2014/0129914 A1 | 5/2014 | Agarwal |
| 2016/0217119 A1 | 7/2016 | Dakin et al. |
| 2016/0253303 A1 | 9/2016 | Pennington et al. |
| 2017/0046622 A1 | 2/2017 | Gaither et al. |
| 2017/0330319 A1* | 11/2017 | Xu ........................... G06T 7/73 |

\* cited by examiner

FACILITATING AUTO-COMPLETION OF ELECTRONIC FORMS WITH HIERARCHICAL ENTITY DATA MODELS

TECHNICAL FIELD

This disclosure relates generally to creating and interrelating objects in a data structures to facilitate retrieval and modification of structured electronic documents. More specifically, but not by way of limitation, this disclosure relates to generating and applying hierarchical entity data models to electronic forms to facilitate auto-completion of the electronic forms.

BACKGROUND

Electronic forms facilitate the collection of information used in, for example, online services and other interactive computing environments. For instance, certain software services allow information entered into one electronic form to be automatically inserted into other electronic forms without requiring manual user input to enter all of the information. For instance, these services predict the form field values that should be inserted into certain fields, then update the fields to include those values without user input or provide an interface prompt to a user to simply select those values without typing a complete field entry. Online form-filling services are therefore able to fill multiple forms with similar information in an automated manner, thereby decreasing the need for users to enter the information via an input device.

In some cases, these form-filling services provide data security capabilities that are unique to electronic data collection and transmission. For example, certain electronic forms are used to collect sensitive data (e.g., user name, personally identifiable information, etc.) from a user device that is required for the user device to access certain features in an interactive computing environment hosted by a remote computing system. Entities seeking illicit access to sensitive information can employ tools that rely on computer-specific features (e.g., typing via a touchpad, electronically displaying text, transmission from a user device to a remote computing environment over a data network) to do so. But, form-filling services that allow insertion of sensitive data without a user typing that data into a form can reduce the risk of this sensitive data being compromised by, for example, a keylogger tool or screen monitoring malware. In addition, autocompletion features can also enable masked filling of forms where, for instance, only obscured versions of sensitive data (e.g., a masked user name such as "J******y" instead of the full user name "Joe_Snuffy") are presented on a user device. If an online form-filling service provides the obscured versions of sensitive data, then the complete version of the sensitive data may never be displayed on the user device's screen or reside on the user device's memory, further decreasing the likelihood of the sensitive data being compromised.

However, these and other advantages offered by form-filling services are less likely to be realized if the form-filling services fail to provide accurate suggestions for filling in electronic forms. For instance, if a form-filling service suggests a user's phone number for a particular field rather than a user's social security number, the user must manually type the social security number into the field. Manually typing this sensitive data into the field eliminates the security and efficiency features of form-filling services provided above.

Existing form-filling solutions present disadvantages with respect to accuracy. For instance, these solutions autocomplete online forms using small fragments of data and without any context of the form. In one example, a web browser autofill function cannot distinguish between multiple fields with the same label. The browser autofill function therefore fails to provide an adequate service for complex forms with multiple fields that are related by context (e.g., a "person 1" address versus a "person 2" address within the same form). Thus, existing services for automatically inserted data into electronic forms often provide an inefficient or other unsatisfactory user experience.

SUMMARY

Certain embodiments involve using an online form filling service for generating a hierarchical entity-data model and filling electronic forms. For instance an online form filling service could be communicatively coupled to an electronic form server system which facilitates autocompleting electronic forms lacking one or more data values. The electronic form server system generates an electronic schema including an input category and input field elements. The electronic form server system accesses a hierarchical entity-data model including and entity category and entity-data elements. The electronic form server system identifies associations between the entity category and input category based on semantic matching of an entity category label and an input field category label including, but not limited to matching text labels or matching a number of fields within an entity category to an input category. The electronic form server system verifies the association by applying a natural language processing engine to the input field elements and the entity-data elements. The electronic form server system autocompletes one or more input field elements with entity data from one or more of the entity-data elements.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
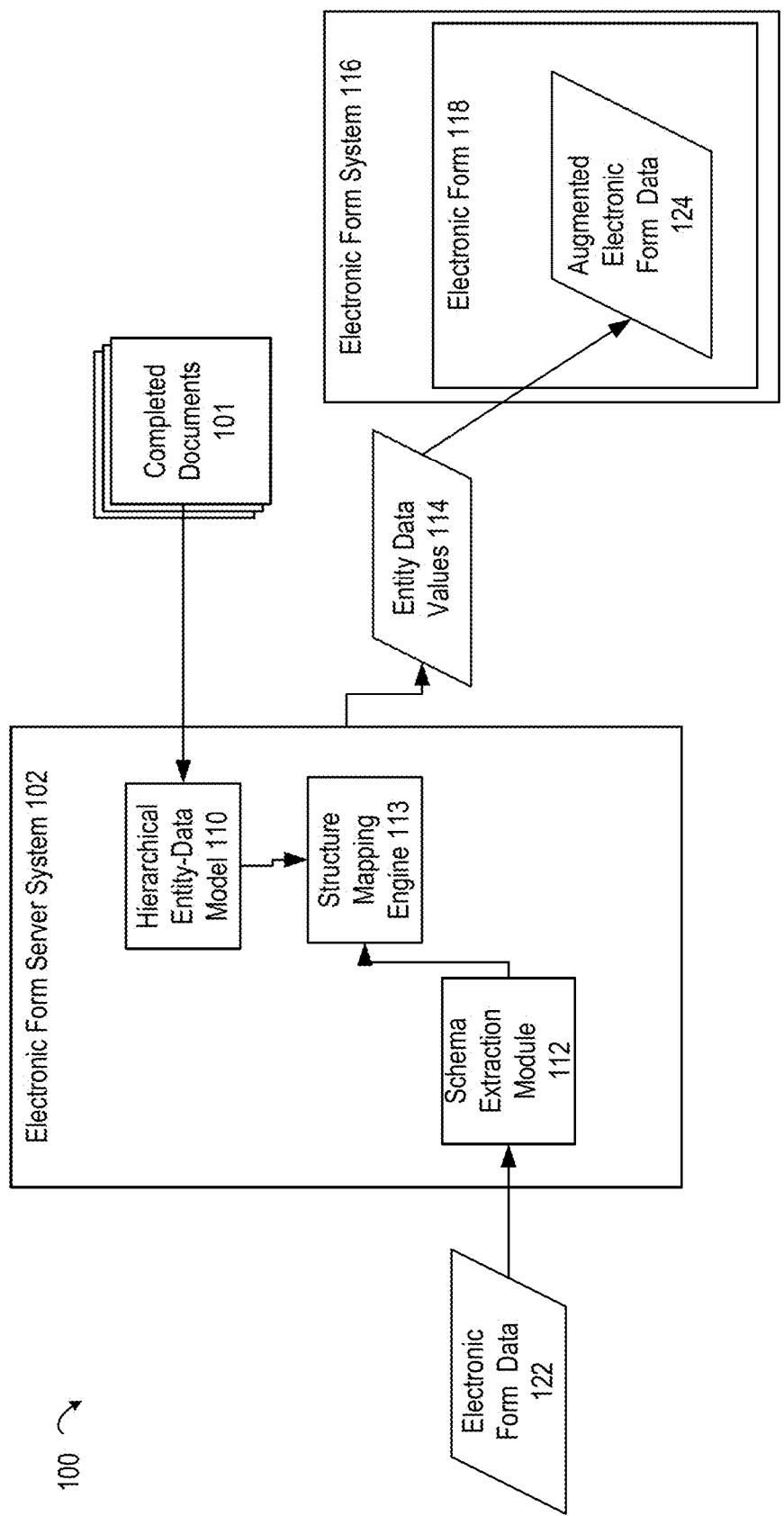
FIG. 1 depicts an example of a computing environment in which an electronic form server system can be used to autocomplete an electronic form with a hierarchical entity-data model, according to certain embodiments of the present disclosure.

Certain embodiments involve applying hierarchical entity data models to electronic forms to facilitate auto-completion of the electronic forms. For instance, an electronic form-filling service identifies associations between an input category and an entity category of a hierarchical entity-data model to determine contextual relationships. A contextual relationship exists between an entity category and an input category. One example of a contextual relationship is "home address" and "physical address" which have the context of a location (an address) where a user resides. Contextual relationships may also be formed between multiple entity categories and an input category. An example of a multiple entity categories to multiple input categories contextual relationship is a first entity category of a first individual (user) and a second entity category of a second individual (relative of user) to a first input category of Applicant and a second input category of Dependent. Determining contextual relationships enables the form filling service to accurately autocomplete input categories that contain similar input field elements (First Name, Last Name) in different input categories. Including contextual relationships allows similar fields to be filled accurately with the appropriate information whereas the existing solutions fail to distinguish similar fields because no context is included.

The following non-limiting example is provided to introduce certain embodiments. In this example, an electronic form-filling service generates a schema extraction that identifies input field elements and input categories of an input electronic form lacking data values for one or more fields. The generation of a schema enables the electronic form-filling service to fill forms that have not been previously processed by the system. An example of a schema extraction is an input category of "Applicant Data" with input elements of "First Name", "Last Name", "Birthday", and a subordinate category of "home address" with input field elements "Street Name", "City", and "State". By generation of a schema extraction, the form filling service can process electronic forms that have not been previously processed by the form filling service. For example, if a format and presentation of a particular electronic form changes over time, the form filling system can generate the schema extraction of the modified form, including its contextual relationships, without requiring manual identification of contextual relationships in the new format of the electronic form.

Continuing with this example, the electronic form-filling service accesses a hierarchical entity-data model that includes entity categories and entity-data elements derived from one or more large sets of previously completed documents. The hierarchical entity-data model is generated by processing completed documents containing entity-data elements storing entity data values. An example of generating the entity-data elements is extracting data values stored in a completed document. Entity data elements include, for example, a Tillable data object (e.g., a form field) along with a label or other descriptive data. The label or other descriptive data can indicate that entity data elements correspond to data attributes such as "city," "state," "zipcode," "employer name," "tax filing state," etc., where examples of entity data values for these entity data elements are "San Jose," "CA," "95110," "Adobe Systems," and "CA." The form filling service determines a contextual relationship (which data values relate to other data values, such as addresses, employers, etc.), and stores the extracted data values as entity-data elements, within entity categories, such as employer name, and address information stored within an entity category "employer data."

To complete an input form in this example, the electronic form-filling service identifies associations between an element of an entity category from the hierarchical entity-data model and an input category from a schema extraction generated for the input form. The associations are identified by comparing text in an entity category label and an input category. In an example, an entity category is "Employment Information" and an input category could be "Employer Data." Additionally, associations are formed by comparing structural information. One example of structural information can be the number of fields within the entity category and input category. An example of comparing the structural information is an entity category of "Home Address" with 5 entity-data elements to an input category of "Applicant Address" with 5 input field elements. In some embodiments, using a combination of the structural information and the text information allows the form-filling service to identify associations between the input form and the hierarchical entity-data model even if the relevant field labels from the input form do not match field labels in the hierarchical entity-data model. For instance, even though an entity category "Residential Address" with five fields may not exactly match, via a text comparison, an input category "Home of Record" with four fields, a structural comparison (i.e., similar numbers of fields) and a semantic comparison (i.e., "Residential" and "Home") shows that the entity category from the hierarchical entity-data model is sufficiently similar to the input category of the schema extraction for autocompletion purposes. The electronic form-filling service autocompletes the input field elements of the electronic form with the verified entity-data elements. The electronic form-filling service can transmit the autocompleted electronic form to an electronic form server or alternatively a user device to display the autocompleted form.

In some embodiments, the electronic form-filling service verifies the association between categories by performing operations involving word vector comparison, semantic, and syntactic natural language processing techniques to the input field elements and entity-data elements. The verification determines that the associations are above a threshold similarity to provide an error prevention during the autocompletion process. An example of verification is performing natural language processing on an entity-data element label "Individual Name" and input field element "Applicant Name." In this example, the natural language processing would use lemmatization to match the second word "Name" in both categories, and semantic analysis to verify that "Applicant" means an individual person and thus matches "individual."

As described herein, certain embodiments provide improvements to online form-filling services by providing an adaptive system for autocompleting forms. Generating a schema extraction and identifying associations between input categories and entity categories provide a system that is capable of autocompleting an electronic form with reduced error as compared to existing autocompletion systems. This capability is enabled by the determination of contextual relationships which reduce error in autocompletion of lengthy electronic forms which often have similar or identical input field labels within multiple categories, for example, "Name" under an applicant category and "Name" under a dependent category. The advantages of determining contextual relationships allow these input field elements to be accurately autocompleted, while existing solutions, which do not have contextual relationships, would fill the input field elements "Name" and "Name" with the same information resulting in errors because they are unable to discriminate a difference between the two input field elements. In some embodiments, the increased accuracy provided by the form-filling service facilitates the completion of electronic forms with little or no manual user input. Reducing the amount of manual input required for accurately completing electronic forms can increase data security by, for example, reducing the exposure of sensitive data to software tools used to intercept that data when it is entered into (or transmitted via) computing devices.

In additional or alternative embodiments, the form-filling service facilitates the completion of electronic forms by deriving new field values from existing data within the hierarchical entity-data model. For example, the form-filling service calculates an "age" value from an existing "birthday" entity-data element and stores the "age" value in an "age" entity-data element, even if the form-filling service has not previously encountered the "age" value in other forms completed for the entity. This further improves data security of autocompletion as the form-filling service is capable of autocompleting input field elements where the data is not explicitly stored on the form-filling service.

As used herein, the term "electronic form" is used to refer to an electronic document having a data object (i.e., a field) configured to receive data via an input device and metadata identifying the data object. The electronic form can be local to a device, or a web-based form, such as an interactive form hosted on a webpage. In some embodiments, a field data object in a form includes formatting that restricts the datatype, data values, or both that are capable of being entered into the field data object. For instance, a field could be configured to only receive a "1" or "0" (e.g., a checkbox value), to only accept a numeric values and a certain number of characters (e.g., a date formatted as "mm/dd/yyyy"), etc.

As used herein, the term "electronic form server system" is used to refer to an electronic server, or group of servers that perform operations on electronic forms as described herein.

As used herein, the term "hierarchical entity-data model" is used to refer to a data structure containing entity categories and entity-data elements. The hierarchical refers to a relationships of multiple entity categories to other entity categories. For example, the hierarchical can be a tiered structure of entity categories such as a first category "individual information" that contains entity categories "biographical information" and "employment information." This structure represents a first tier of the hierarchical. Continuing the example, the entity category "biographical information" contains entity categories "home address" and "demographic information" that represent a second tier of the hierarchical containing entity data elements. The entity categories and entity data elements contain information regarding a user or group of users and is derived from a large corpus of completed documents. In some embodiments, entity-data elements are formatted in accordance with formatting restrictions in field data objects (e.g., formatting that restricts the datatype or data values capable of being entered into the field data object). In additional or embodiments, a form-filling service executed by an electronic form server system can transform the formatting of data stored in entity-data elements into the formatting required by field data objects in an electronic form (e.g., converting a date stored as "Nov. 5, 1955" to "11/05/1955").

As used herein, the terms "autocomplete" and "autocompletion" are used to refer to modifying a field data object in an electronic form to store field data. In some embodiments, autocompletion involves formatting the data in accordance with a datatype for which the field data object is configured, as in the example of transforming data formatting identified above.

Referring now to the drawings, FIG. 1 depicts an example of a computing environment 100 in which an electronic form server system 102 that is useable for auto-completing one or more fields of an electronic form 118 using a hierarchical entity-data model 110 and a schema extraction 112. In various embodiments, the computing environment 100 includes one or more of the electronic form server system 102 and an electronic form system 116.

The hierarchical entity-data model 110 includes one or more entity categories and entity data elements. Entity data elements are data objects for storing data describing attributes associated with an entity, such as a first name, last name, child name, business address, etc. The hierarchical entity-data model 110 also includes, for each entity data element, an entity-data element label. An entity-data element label is an identifier indicating a particular attribute of the entity (e.g., an entity-data element label of "FNAME" for an entity's first name). An entity category identifies a group of related information. A non-limiting example of a category is "Employer Information" that contains entity data elements such as company name, employer address, job title, work phone number, and other information relating to the employer information. In some embodiments, the electronic form server system 102 is used to generate or update the hierarchical entity-data model 110 using data from previously completed electronic documents. In some embodiments, a hierarchical entity data model 110 can relate to a single user or entity. In alternative embodiments, a hierarchical entity-data model 110 can relate to a group of users or entities.

For instance, the electronic form server system 102 receives completed documents 101. In one example, a completed document is an image or other data capture of an electronic or paper form in which a user has provided values for particular fields (e.g., a form with an "Address" field along with an address value of "123 Baker Street"). Each of the completed documents 101 includes electronic data used to identify one or more field values for the hierarchical entity-data model 110. In some embodiments, completed documents 101 include structured digital forms in formats such as PDF, HTML, XML, etc. A structured digital form can include, for example, specific field objects (e.g., a Tillable field, a radio button, a checkbox, etc.) that can be manipulated via interactions with a user device. A structured digital form can also include tags, labels, or other metadata that identify one or more of the field objects (e.g., "First Name," "Address," etc.). In additional or alternative embodiments, completed documents 101 include images of a completed paper form. For instance, paper forms such as a VISA form, income tax form, or a mortgage loan application are scanned to generate image data, which is uploaded to the electronic form server system 102 from a user device.

The electronic form server system 102 extracts the contents of the completed document 101. In one example, extracting the content of a completed document 101 includes identifying field labels from metadata of a structured completed document and field values from the data objects within the structured completed document. In another example, extracting the content of a completed document 101 includes creating a snapshot image of the completed document 101 and applying one or more document structure detection networks to extract field labels and field values from the completed document 101. An example of a document structure detection network is a trained neural network as described elsewhere herein. As described in more detail herein with respect to FIG. 6, the electronic form server system 102 aggregates the extracted contents into a hierarchical entity-data model 110.

The electronic form server system 102 applies the hierarchical entity-data model 110 to update one or more fields of an electronic form 118. For instance, the electronic form server system 102 receives electronic form data 122. An example of electronic form data 122 is metadata including input categories and input field elements. In some embodiments, the electronic form data 122 is obtained from a particular electronic form 118 that lacks data in one or more input field elements (e.g., has blank input field elements, has input field elements with data that a user wishes to modify, etc.). The electronic form server system 102 executes a schema extraction module 112 to generate a schema extraction of the electronic form 118. The schema extraction includes one or more of a form structure, input categories, and input field elements of the electronic form 118.

To update the electronic form 118, the electronic form server system 102 executes a structure mapping engine 113 that automatically identifies associations among the form structure, input categories, and/or input field elements of the schema extraction and the hierarchical entity-data model 110. For instance, the structure mapping engine 113 determines, based on analyzing a set of input field elements within the schema extraction that a particular input category potentially corresponds to an entity category from the hierarchical entity-data model 110. The structure mapping engine 113 performs natural-language processing to verify the potential correspondence. Examples of identifying and verifying associations between the model 110 and the schema extraction are described herein with respect to FIG. 2. If the potential correspondence is verified, the electronic form server system 102 modifies the electronic form data 112 based on the model 110, and thereby generates augmented electronic form data 124. Augmented electronic form data 124 includes, for example, updated field values for the electronic form 118. In additional or alternative embodiments, the structure mapping engine 113 can include a set of one or more business rules that define other associations that may be used. In some cases, these business rules can be defined by a user of electronic form server system 102, or may be implemented during design.

Figure 2:
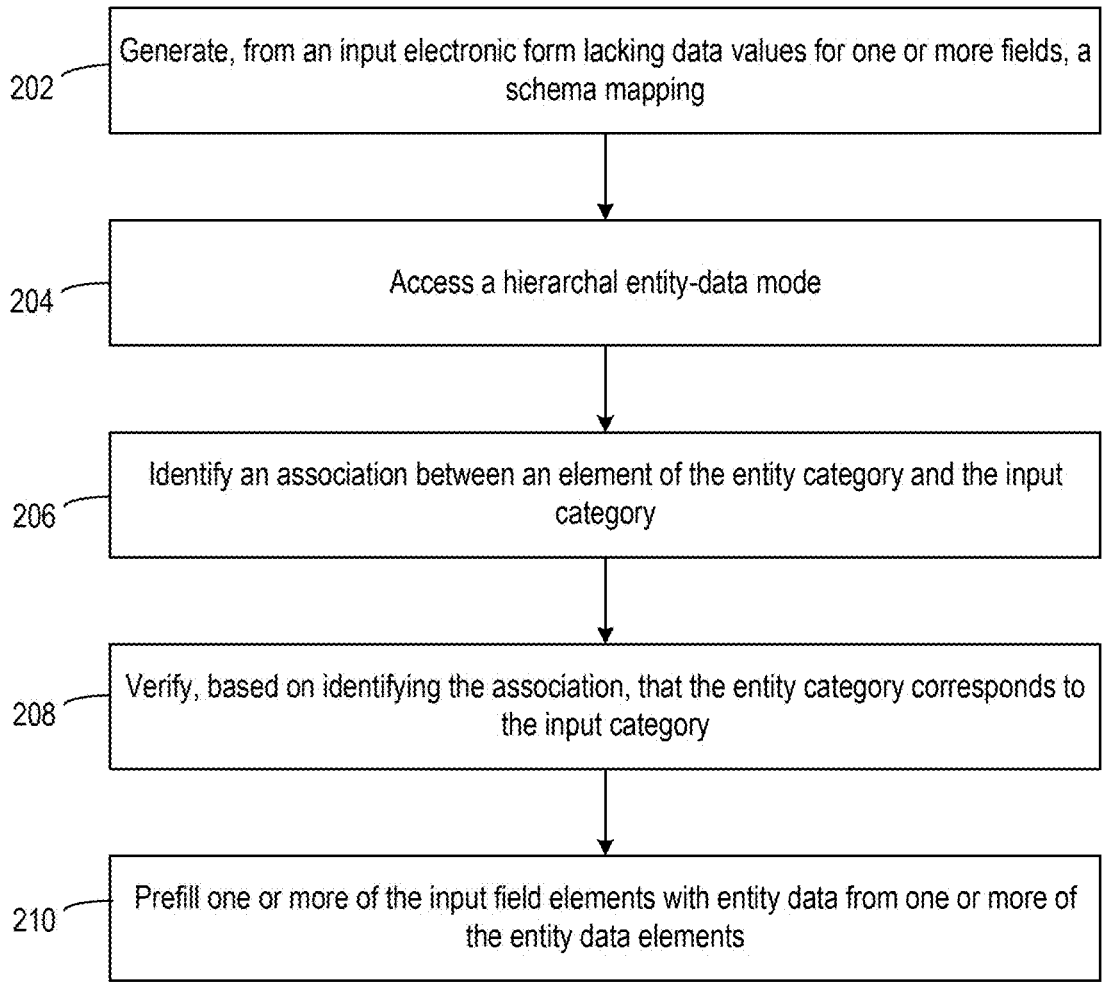
FIG. 2 depicts a process for identifying associations between a hierarchical-entity data model and input field elements of an electronic form, and autocompleting one or more of the input field elements with entity data from one or more of the entity data elements, according to certain embodiments of the present disclosure.

FIG. 2 depicts a process 200 for identifying associations between a hierarchical-entity data model and input field elements of an electronic form, and autocompleting one or more of the input field elements with entity data from one or more of the entity data elements. One or more computing devices (e.g., the electronic form server system 102) implement operations depicted in FIG. 2 by executing suitable program code. For illustrative purposes, the process 200 is described with reference to certain examples depicted in the figures. Other implementations, however, are possible.

At block 202, the process 200 involves generating a schema extraction from an electronic form lacking data values for one or more fields. For example, a schema extraction module 112 generates a schema extraction from electronic form data, such as electronic form data 122. Schema extraction module 112 receives electronic form data 122 from an electronic form server 116. Electronic form server 116 obtains electronic form data 122 from an electronic form 118 that lacks data in one or more input field elements.

In some cases, generation of the schema extraction uses an application programming interface (API) to access metadata or structure information of electronic form data 122. Examples of the electronic form data 122 include form name, input field element labels, input section titles, and a blank input field element identifier in metadata or other file structures.

Schema extraction module 112 generates a schema of the electronic form by extracting schema information from metadata of electronic form data 122. The schema includes one or more of a form structure, input categories (e.g. groups of input field elements), and input field elements of the electronic form data 118. An example of the schema could be a database, an HTML/XML document, or any electronic document or other medium capable of storing such information (e.g., .PDF, .DOCX, .DOC, .RTF, .TXT, .CSV).

Additionally or alternatively, schema extraction module 112 can generate a schema from a printed or "flat" form (e.g., a paper form, a digital copy lacking metadata) by applying one or more document structure detection networks to the flat form to create the electronic form data 122 and subsequently generating a schema as described elsewhere herein.

Generating the schema extraction using the document structure detection network involves creating image files of the content, and applying a trained neural network to perform feature extraction of the images to generate electronic form data 122. The document structure detection network is described in more detail in respect to FIG. 6. In some embodiments, the schema is generated in advance of the system implementation (e.g., building a repository of schema from a repository of electronic form data 122). In additional or alternative embodiments, the schema extraction can be generated at run-time or in parallel with other blocks from process 200.

At block 204, the process 200 involves accessing a hierarchical entity-data model. A hierarchical entity-data model is generated and stored on a server, such as electronic form server system 102. The electronic form server system 102 generates a hierarchical entity-data model containing an entity category and entity data elements. In some embodiments, an entity category contains a group of entity data elements. For example, an entity category of "Biographical information" could include elements such as first name, last name, birthday, citizenship, eye color, blood type, etc. In additional or alternative embodiments, an entity category can contain other entity categories such as entity category "Personal Information" containing entity categories "biographical information", "educational information", or "employer information." In yet other embodiments, entity categories can be in a nested structure creating a hierarchical of entity categories. In an example of a nested category, an entity category "personal information" that contain entity category "biographical information" that contains entity category "home address" that contains entity-data elements.

At block 206, the process 200 involves identifying an association between an element of the entity category and the input category. In some embodiments, elements of the entity category and the input category have associations that can be identified by comparing elements of the entity category and the input category.

An example of an association is a structural similarity between entity category and input category (e.g., entity category has four entity-data elements; input category has four input field elements). A structural similarity is a commonality of a structural element, such as a number of entity-data elements and input field elements, or a similar data type of the entity-data elements and input field elements. An example of a structural similarity is an entity category "home address" having 5 entity-data elements and an input category of "location" having 5 input field elements. An alternative example of structural similarity is an entity category containing 3 entity-data elements that are text and 1 entity-data element that is an unsigned number as compared to an input category containing 4 input field elements of text and 2 input field elements of unsigned numbers. A structure mapping engine, such as structure mapping engine 113 determines the structural similarity between the entity category and the input category by measuring the number of structural similarities between an entity category and an input category. In an alternative embodiment, the structure mapping engine 113 determines the structural similarity as a percentage of the entity category and the input category which having matching structures as described above.

Another example of an association is a linguistic similarity between the entity category label and the input category label. In some embodiments, the structure mapping engine 113 performs natural language processing to determine an association between entity category label and input category label. The natural language processing includes syntactic or semantic processing to identify associations between the entity category label and input category label. Some examples of syntactic processing can include lemmatization, part-of-speech tagging, stemming and word segmentation. For instance, consider an example with an entity category label "home address" and an input category label "mailing address." The natural language processing of the entity category label and input category label would result in the matching of the word "address" used in both labels. This match can be determined by a variety of methods as would be understood by one of ordinary skill in the art. The semantic processing of "home address" and "mailing address" yields a particular location (in the form of an address) commonly associated with an individual. Another example of semantic processing is an entity category label "work address" and an input category label of "employer address." Performing semantic processing yields a clear relationship between "work" and "employer."

The structure mapping engine 113 determines that an entity category matches an input category by aggregating the structural similarity and linguistic similarity. For example, the structure mapping engine assigns a weighted percentage to structural similarity and linguistic similarity and compares the aggregate of the structural similarity and the linguistic similarity to a threshold similarity to determine a matching structure.

Figure 3:
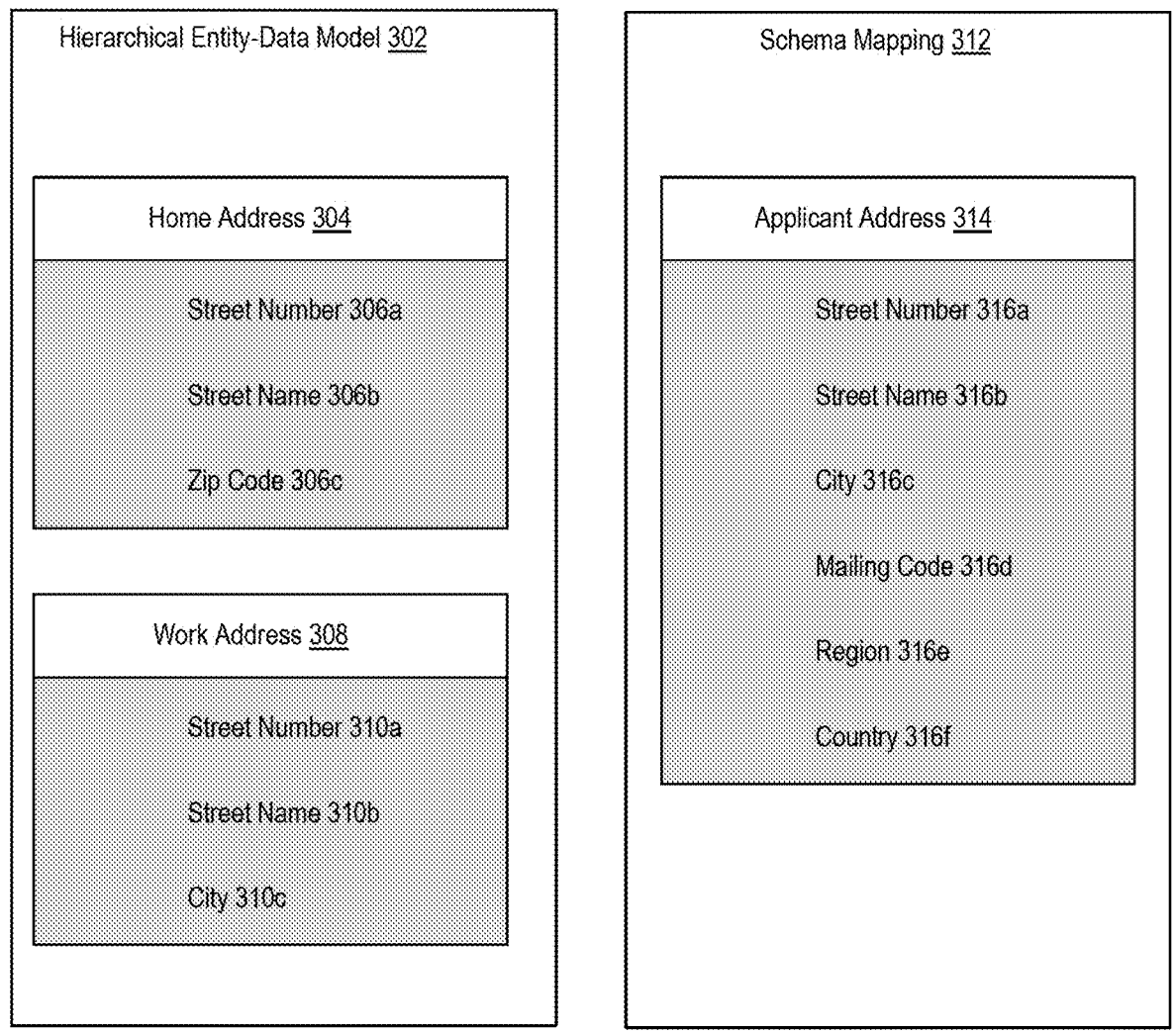
FIG. 3 depicts a matching engine, such as structure mapping engine for identifying associations between elements of a hierarchical entity-data model and input elements of a schema extraction, according to certain embodiments of the present disclosure.

FIG. 3 depicts an example of a structure mapping engine 113 implementing block 206 by identifying associations between elements of a hierarchical entity-data model and input elements of a schema extraction. The hierarchical entity-data model contains one or more entity categories. In the example shown in FIG. 3, the entity categories are home address 304 and work address 308. The entity-data elements of the home address 304 category are street number 306*a*, street name 306*b*, and zip code 306*c*, collectively "entity-data elements 306." The entity-data elements of entity category work address 308 are street number 310*a*, street name 310*b*, and city 310*c*, collectively entity-data elements 310. Schema extraction 312 has an input category applicant address 314. The input category applicant address 314 contains multiple input field elements such as street number 316*a*, street name 316*b*, city 316*c*, mailing code 316*d*, region 316*e*, and country 316*f*, collectively input field elements 316.

The structure mapping engine 113 identifies associations between elements of the hierarchical entity-data model 302 and schema extraction 312. For example, schema extraction 312 has an input category applicant address 314 containing multiple input field elements 316. In some cases, the input category of the schema extraction, in this example, applicant address 314 contains input field elements that can be associated with one or more elements of the hierarchical entity-data model 302. The association can be identified by matching by natural language processing as described above, matching data type, matching field labels, or by comparing other metadata about the entity-data elements 306 and the input field elements 316. The structure mapping engine 113 generates a confidence score of the identified associations. The confidence score is determined by comparing the number of identified associations. For example, the confidence score increases for each association determined as a match (e.g., NLP, data type, field label). In additional embodiments, the confidence score is further increased as input field elements 316 and entity-data elements 306 contain matches which are related (e.g., matching a street name 306*b* and a zip code 306*c*). In some embodiments, a structural comparison is used to compute or update a confidence score, as described below with respect to block 208.

In some embodiments, an electronic form server system 102 can store the associations determined between the hierarchical data model 302 and the schema extraction 312 for future iterations with a subsequent hierarchical data model and schema extraction (e.g., from another user and the same electronic form data).

For example, the entity data element street number 306*a* is associated with input field element street number 316*a*. The association between the entity data element 306 and the input field elements 316 in this example is determined by the common data type. Alternatively, the association can determined by similar placement within the respective category (e.g., the first member of an entity category or input category). In some embodiments, the hierarchical data model 302 have more than one entity-data element associated with an input field element of the schema extraction 312.

For example, the work address 308 category has a street number 310*a*, which is also associated with street number 316*a* in the input category applicant address 314 of the schema extraction 312. In an example where the entity-data element is associated with multiple input field elements of the schema extraction 312, other processing such as natural language processing of the input field element labels or categories is performed to determine the most accurate association. In some cases, the entity-data element is associated with multiple input field elements, such as a case of a form with input field elements that duplicated input field element information (e.g., home address, mailing address). The associations described above are formed for every entity-data element in the hierarchical data model 302 and every input category and input field element in schema extraction 312.

Returning to FIG. 2 at block 208, the process 200 involves verifying, that the identified associations indicate that the entity category corresponds to the input category. An example of verification is determining that the identified associations are valid by comparing the computed confidence score of the association with a threshold confidence score at a category level. For instance, the verification is when the confidence score exceeds a threshold value. The confidence score is increased depending on the number of input field elements 316 in the input category 314 of the schema extraction 312 that match the entity-data elements 306 or entity-data elements 310 within the entity category home address 304 or work address 308. In some embodiments the confidence score can be increased based on a quantity of fields, metadata, or other properties of the completed documents that can be matched using the methods described elsewhere herein including natural language processing, structural comparison, or metadata extraction. In other examples the confidence score can be adjusted based on a percentage of entity categories that match with input-categories, or alternatively based on a percentage of other document properties that match to include metadata of the document, categories, or elements. In an embodiment that applies natural language processing at the entity-data element and input field element levels, each match between an entity-data element and an input field element can increase the confidence score of a matching entity category and input category.

In additional or alternative embodiments, entity-data elements and input field elements can be associated with one or more categories. For example, name and identifying information is be contained in an entity category "personal information" that contains elements associated input categories such as physical address and mailing address. In this example, it is likely that the entity category contains entity-data elements that are associated with one or more of input categories.

At block 210, the process 200 involves autocompleting one or more input field elements with entity data from one or more of the entity data elements. The autocompleting of input field elements transfers the value of entity data from one or more of the entity data elements into the input field element. In some embodiments, the electronic form server system transmits entity data values 114 to the augmented electronic form data 124 that modifies the contents of the electronic form 118. The electronic form server 116 is capable of submitting the electronic form 118, or alternatively transmitting the electronic form 118 to a user device. In additional or alternative embodiments, the electronic form server system 102 transmits the entity data values 114 to augmented electronic form data 124 In this embodiment, the user device updates a form presented on the user device with entity data values 114.

For example, the values of entity-data elements are transferred into the input field elements. An example of the transfer of data is submitting data into an online form, writing data into a file, storing a value into a database, or modifying the metadata of the electronic form 118.

In some embodiments, the electronic form server system 102 ### identifies that an input field element of the schema extraction does not have a corresponding entity-data value in the hierarchical entity-data model. In such cases, the electronic form server system 102 can generate additional entity-data elements. The electronic form server system 102 generates additional entity-data elements from existing entity-data elements as described in relation to FIG. 4.

Figure 4:
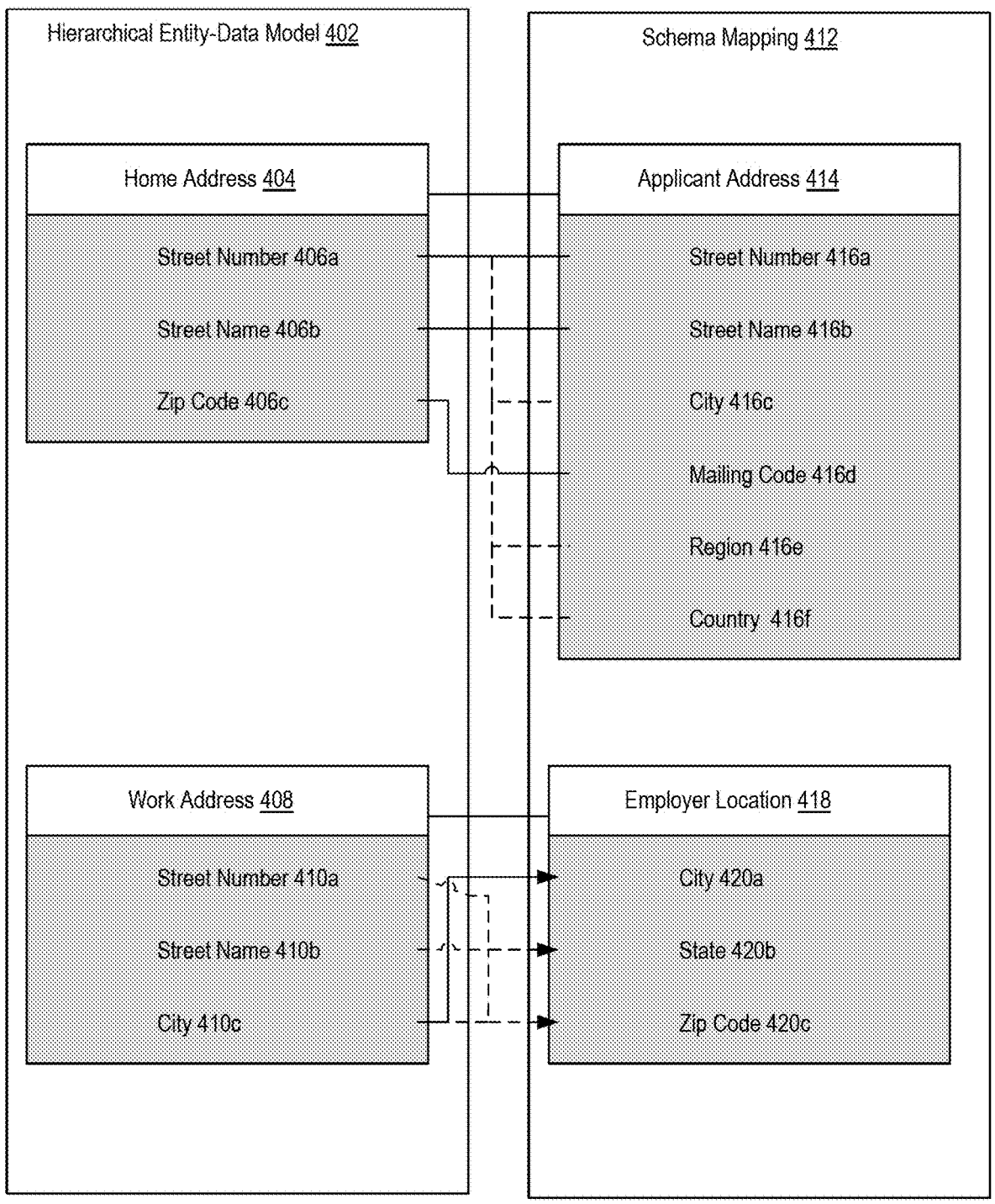
FIG. 4 depicts an example of identifying one or more fields of the schema extraction that does not have a corresponding entity-data value in the hierarchical entity-data model, according to certain embodiments of the present disclosure.

FIG. 4 depicts an example of identifying one or more fields of the schema extraction 412 that does not have a corresponding entity-data value in the hierarchical entity-data model 402. In some cases, the schema extraction 412 contains input field elements that do not have an entity-data element that can be verified as associated with the input field element.

As illustrated in FIG. 4, the hierarchical entity-data model 402 contains multiple elements in one or more categories. In a non-limiting example, one category is home address 404 with entity-data elements street number 406a, street name 406b, and zip code 406c, collectively "entity data elements 406." The category home address 404 has been verified as associated with input category applicant address 414. The process of verification is described elsewhere herein, particularly with relation to FIG. 2. The input category applicant address 414 has multiple input field elements including street number 416a, street name 416b, city 416c, mailing code 416d, region 416e, country 416f, collectively input field elements 416.

In this example, the input category applicant address 414 has input field elements 416 that are lacking from entity category home address 404. The electronic form server system 102 generates additional entity-data elements that can be aggregated into entity-data elements 406.

As illustrated in FIG. 4, entity-data elements 406 do not contain an element with city/region/country information; however, input field elements 416 do contain input field elements city 416c, region 416e, and country 416f. City, region, and/or country information can be generated into an additional entity-data element from the existing entity-data elements contained in the hierarchical entity-data model 402. City information is generated from street number 406a, street name 406b, and zip code 406c by performing geocoding functions to determine a best match of city. In additional or alternative embodiments, the electronic form server system 102 aggregates the generated additional entity-data elements into the hierarchical entity-data model 402 for future usage.

Expanding on the previous example, the electronic form server system 102 can generate multiple input field elements from an entity-data element. For example, the input category employer location 418 contains input field elements city 420a, state 420b, and zip code 420c. In this example, the entity category is work address 408 that contains street number 410a, street name 410b, and city 410c.

The electronic form server system 102 generates multiple additional entity-data elements from entity-data elements 410 to calculate city, state, and zip code information by performing geocoding operations. An alternative embodiment generates multiple additional entity-data elements by performing searches of public or private data sources accessible by the electronic form server system 102. The multiple additional entity-data elements are aggregated into entity category work address 408 and stored in the hierarchical entity-data model 402. The aggregation of generated data improves robustness of the hierarchical entity-data model 402 and enables more efficient processing of subsequent electronic schemas. The efficiency is gained by increasing the number of entity-data elements of the hierarchical entity-data model 402 that decreases the number of fields that are needed to be generated in future iterations.

In another example, a category could be "personal information" containing an entity-data value of "birthday." For an input field element of "age", the electronic form server system 102 generates the additional entity-data element of "age" by performing a difference computation of current time on the electronic form server system 102 and the entity-data element of "birthday." It should be appreciated that the examples of generating additional entity-data elements are not limiting, but exemplary of potential entity-data element generation techniques.

Figure 5:
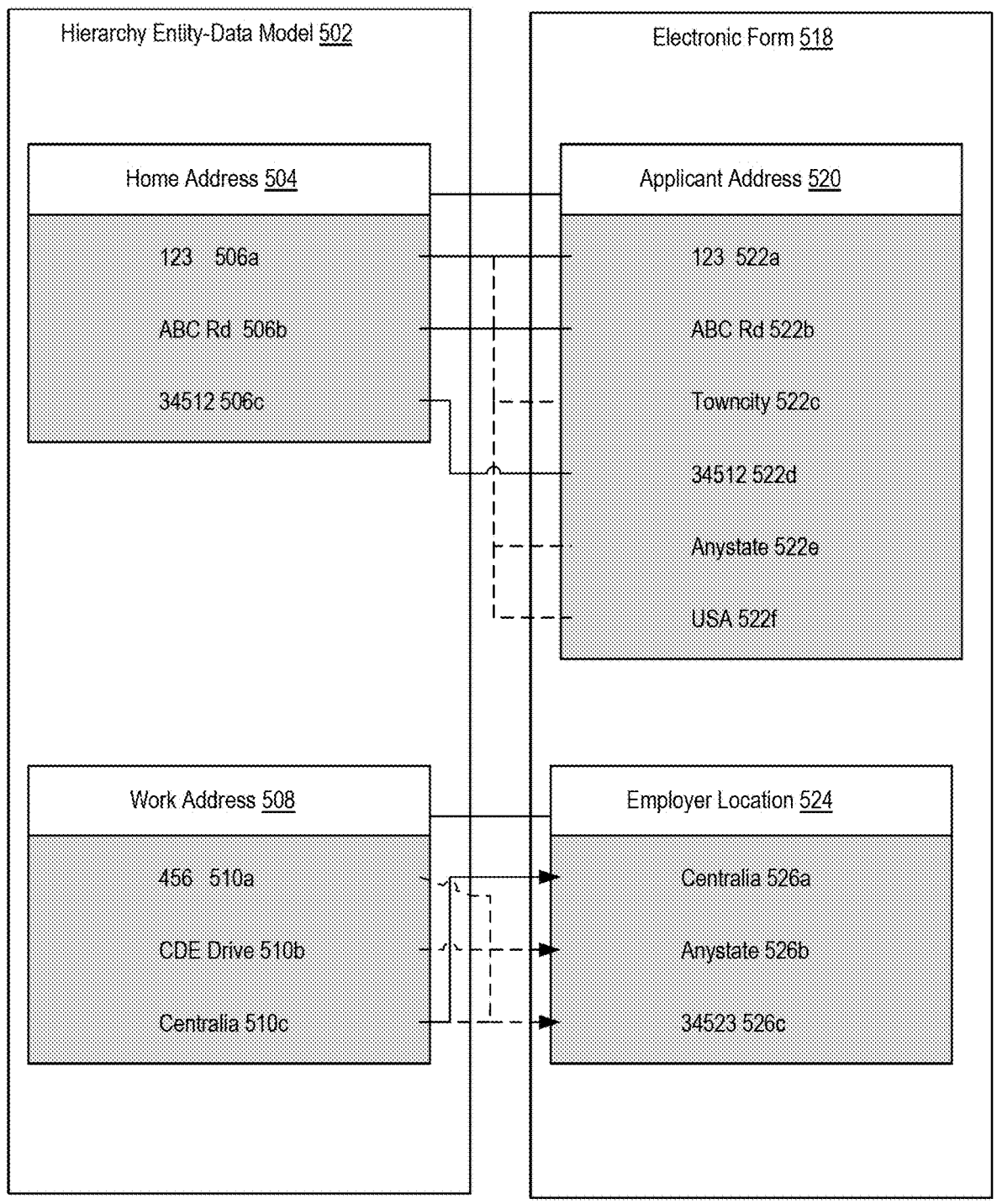
FIG. 5 illustrates an example of using a hierarchical entity-data model to autocomplete an electronic form, according to certain embodiments of the present disclosure.

FIG. 5 illustrates an example of autocompleting an electronic form 518 from entity-data elements of a hierarchical entity-data model 502. For instance, hierarchical entity-data model 502 has one or more entity categories. As illustrated in FIG. 5, the entity categories are home address 504 and work address 508. The electronic form 518 has input categories applicant address 520 and employer location 524.

The home address 504 entity category has been previously verified as associated with the applicant address 520 input category. An electronic form server system 102 transfers entity-data values from the hierarchical entity-data model 502 into the electronic form 518. The entity-data elements 506*a*, 506*b*, and 506*c* are illustrated with an exemplary data value "123", "ABC Rd", and "34512" respectively for illustrative purposes.

The electronic form server system 102 autocompletes the entity-data element 506 data values into input field elements contained in input field elements 522*a*, 522*b*, and 522*d*. The electronic form server system 102 also generates additional entity-data elements from entity-data elements 506 to autocomplete input field elements 522*c*, 522*e*, and 522*f*. The generation of additional entity-data elements is performed as described elsewhere herein.

In this embodiment, the entity-data elements contained in the work address 508 entity category are autocompleted into the input field elements 526 employer location 524 input category. For instance, a semantic matching between a "work address" entity category and an "employer location" input category (e.g., can be obtained by performing natural language processing as described with respect to FIG. 2. The electronic form server system 102 autocompletes input field elements 526 by generating additional entity-data elements "anystate" 526*b* and "34523" 526*c*.

Figure 6:
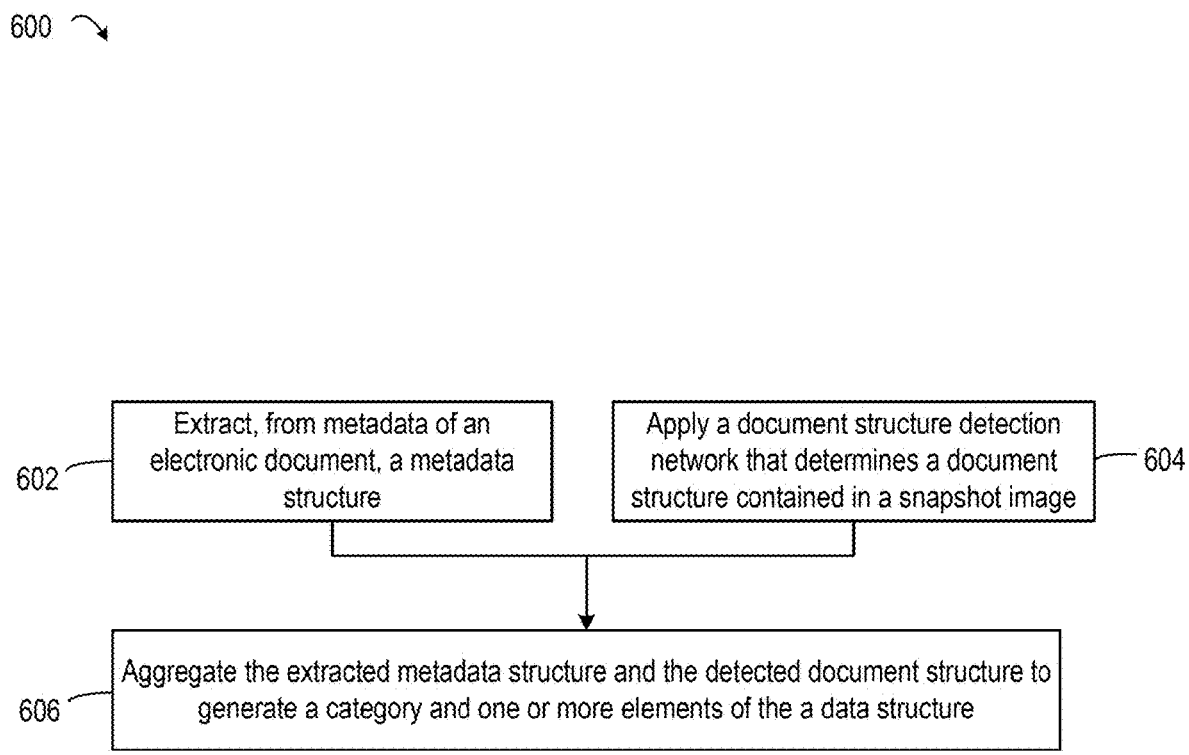
FIG. 6 depicts a process to generate a hierarchical entity-data model from an existing corpus of completed documents, according to certain embodiments of the present disclosure.

FIG. 6 depicts a process 600 to generate a data structure from an existing corpus of completed documents. For instance, the electronic form server system 102 generates a document structure by extracting metadata of an electronic document and applying a document structure detection network to determine a document structure.

It should be understood that while the remaining description of FIG. 6 is explained with regard to generating a hierarchical entity data model, the process also applies to generation of the schema of electronic forms. Further, the process described herein can be applied to both known document formats and is capable of being applied to a previously unknown document structure. An example of an unknown document structure would be a form that is created with a structure that the process 600 has not previously processed such as, a newly created form.

At block 602, the process 600 involves extracting a metadata structure from metadata in an electronic document. For example, many electronic documents retain structural information in metadata or a similar method of storing document properties (e.g., a document properties file of a compressed archive). An example of metadata structures in an electronic document include extensible markup language (XML) or JSON files appended to core document file. Alternatively, the metadata could be hypertext markup language (HTML). A majority of electronic document formats have APIs that enable access to the contents using a predefined protocol depending on file type. In some embodiments, the electronic server system 102 extracts the metadata structure with an API correlating to the document file type or metadata storage method. In alternative or additional embodiments, the electronic server system 102 extracts metadata by parsing the document with natural language processing to determine a document structure (e.g., documents that hold structural information as key strings). Parsing a document to extract strings and terms by natural language processing should be well understood by one of ordinary skill in the art. The electronic form server system 102 extracts metadata and transforms the extracted metadata into the hierarchical entity-data model, which in some instances is be an XML document containing certain predefined structural elements.

At block 604, the process 600 involves applying a document structure detection network that determines a document structure contained in a snapshot image. For example, certain electronic documents or paper documents are "flat" and lack at least some metadata structure necessary to perform extraction of the data structural information. An example of an electronic document characterized by a flat structure is a "print to file" document where the contents have been printed into the electronic document. While block 604 is described with regard to "flat" electronic documents, it should be appreciated that block 604 can also be applied to an electronic document that contains metadata.

In some embodiments, the electronic form server system 102 applies a document structure detection network, which is be a trained neural network, create one or more snapshot images of the document, perform feature extraction of the snapshot images, and identify at least one document structural element contained in the feature extraction. In some cases, the features of the snapshot images are document field labels, field type, section boundaries, headers, footers, hyperlinks, section headings, groups of document fields, bold fonts, or other features of the image that identify the document structure.

For example, a PDF form is completed and printed to a file to create a "flat electronic document." The electronic form server system 102 applies a document structure detection network to the flat electronic document to determine a structural element. The document structure detection network creates snapshot images, which in some cases are screenshots or thumbnails of the flat electronic document. The document structure detection network applies a feature extraction algorithm to the images to determine text strings (field labels), groups of fields (location grouping), and section titles (font difference, placement of titles). The document structure detection network extracts document features from the snapshot images. In some cases, the document structure generated is an XML document or a JSON document.

At block 606, the process 600 involves aggregating the extracted metadata structure and the detected document structure to generate the entity category and one or more entity-data elements of the hierarchical entity-data model.

For example, an extracted metadata structure has certain components of a document structure, while a detected document structure has certain other components of the document structure. The extracted metadata structure and the detected document structure can contain duplicate or different components due to many factors described herein. In a non-limiting example, the extracted metadata structure and the detected document structure contain a category with one or more fields. In some embodiments, the extracted metadata structure and detected document structure contain information that is present in both structures. Structure information that is determine to be present in both extracted document structure and detected document structure can be due to metadata quality, snapshot image quality, or strong correlations between metadata and actual document content. For example, the metadata has a detailed structural definition and a high quality snapshot image provides optimal detection of features from the snapshot image. Additionally, the metadata is strongly correlated to the features extracted from the snapshot image. The correlation strength between metadata and features extracted from the snapshot image is determined by any of the techniques described herein for determining matches (e.g., a quality score). In other examples, may contain different structural information due to low quality snapshot images, low quality metadata structural definition, or a lack of strong correlation between metadata information and actual document content. An example of a lack of strong correlation is an electronic document that has section titles and input field elements that do not match the metadata descriptions of the same. For instance, the metadata description could be a short code for the field label in the detected structure. In such cases, an aggregation engine compares location within the form to attempt to determine if the data is duplicative, or if aggregation is more appropriate. The electronic form server system 102 aggregates the extracted metadata structure and detected document structure into a single XML data structure. Alternatively, the aggregation could be performed into a table, database, or other suitable method for storing structure information. In embodiments where the extracted metadata structure and the detected document structure have duplicate values, the electronic form server system 102 removes the duplicate to provide a streamlined hierarchical data structure. In other embodiments where there are no duplicates, the electronic form server system 102 aggregates the extracted metadata structure and the detected document structure by combining the categories and elements into a single hierarchical entity-data structure. In some embodiments, the electronic form server system 102 forms the hierarchical entity-data structure by determining a hierarchy of relationships and storing the categories and elements at the appropriate layer of the hierarchy. In some embodiments, the aggregation engine assigns one or more categories or elements a location within the hierarchical structure. An example is determining that one or more categories are related, and the aggregation engine can determine a first category which can contain a second category in a nested structure.

Example of a Computing System for Implementing Certain Embodiments

Figure 7:
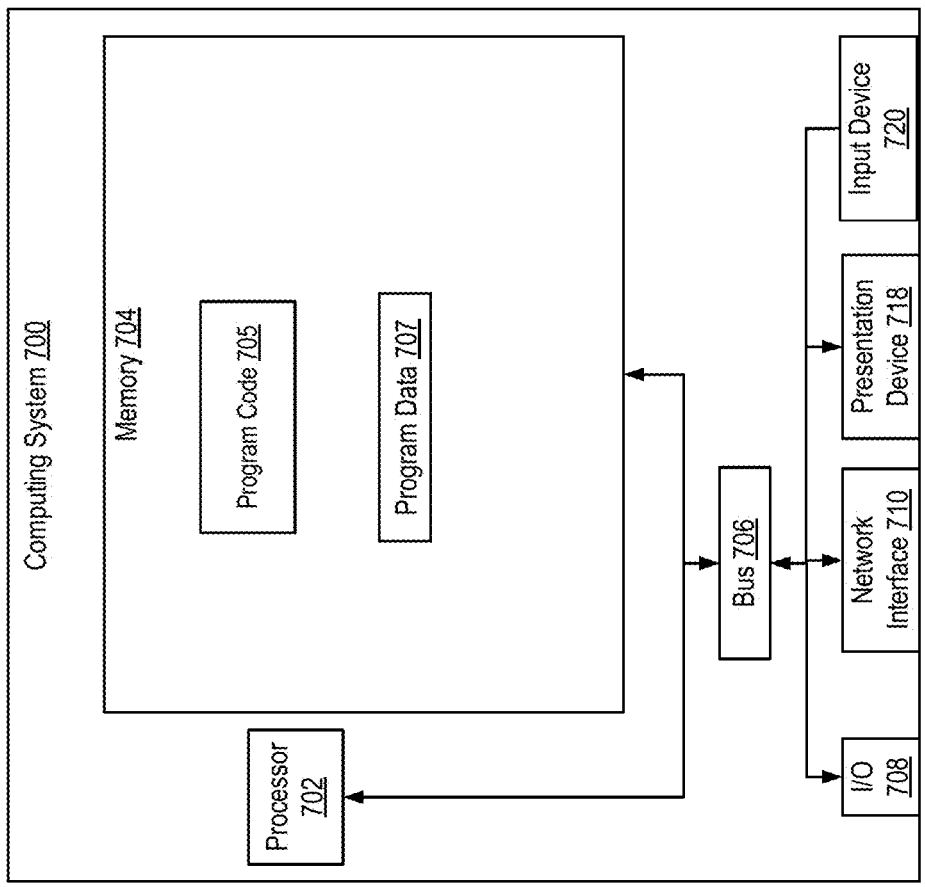
FIG. 7 depicts an example of the computing system for implementing certain embodiments of the present disclosure.

Any suitable computing system or group of computing systems can be used for performing the operations described herein. For example, FIG. 7 depicts an example of the computing system 700. The implementation of computing system 700 could be used for one or more of an electronic form server system 102 and an electronic form system 116. In other embodiments, a single computing system 700 having devices similar to those depicted in FIG. 7 (e.g., a processor, a memory, etc.) combines the one or more operations and data stores depicted as separate systems in FIG. 1.

The depicted example of a computing system 700 includes a processor 702 communicatively coupled to one or more memory devices 704. The processor 702 executes computer-executable program code stored in a memory device 704, accesses information stored in the memory device 704, or both. Examples of the processor 702 include a microprocessor, an application-specific integrated circuit ("ASIC"), a field-programmable gate array ("FPGA"), or any other suitable processing device. The processor 702 can include any number of processing devices, including a single processing device.

A memory device 704 includes any suitable non-transitory computer-readable medium for storing program code 705, program data 707, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 700 may also include a number of external or internal devices, an input device 720, a presentation device 718, or other input or output devices. For example, the computing environment 100 is shown with one or more input/output ("I/O") interfaces 708. An I/O interface 708 can receive input from input devices or provide output to output devices. One or more buses 706 are also included in the computing system 700. The bus 706 communicatively couples one or more components of a respective one of the computing system 700.

The computing system 700 executes program code 705 that configures the processor 702 to perform one or more of the operations described herein. Examples of the program code 705 include, in various embodiments, code for performing the electronic form processing executed by the electronic form server system 102 (e.g., functions of the schema extraction module 112), the structure mapping engine 113, the hierarchical entity-data model 110, or other suitable applications that perform one or more operations described herein (e.g., one or more development applications for generation of the hierarchical entity-data model 110, electronic form data 122, or entity data values 114). The program code may be resident in the memory device 704 or any suitable computer-readable medium and may be executed by the processor 702 or any other suitable processor.

In some embodiments, one or more memory devices 704 stores program data 707 that includes one or more data structures and schema extractions described herein. Examples of these datasets include the hierarchical entity-data model 110, schema extraction, completed documents 101, electronic form data 122, document structure information, etc. In some embodiments, one or more of data sets, models, and functions are stored in the same memory device (e.g., one of the memory devices 704). In additional or alternative embodiments, one or more of the programs, data sets, models, and functions described herein are stored in different memory devices 704 accessible via a data network.

In some embodiments, the computing system 700 also includes a network interface device 710. The network interface device 710 includes any device or group of devices suitable for establishing a wired or wireless data connection to one or more data networks. Non-limiting examples of the network interface device 710 include an Ethernet network adapter, a modem, and/or the like. The computing system 700 is able to communicate with one or more other computing devices (e.g., a computing device executing an electronic form server system 102) via a data network using the network interface device 710.

In some embodiments, the computing system 700 also includes the input device 720 and the presentation device 718 depicted in FIG. 7. An input device 720 can include any device or group of devices suitable for receiving visual, auditory, or other suitable input that controls or affects the operations of the processor 702. Non-limiting examples of the input device 720 include a touchscreen, a mouse, a keyboard, a microphone, a separate mobile computing device, etc. A presentation device 718 can include any device or group of devices suitable for providing visual, auditory, or other suitable sensory output. Non-limiting examples of the presentation device 718 include a touchscreen, a monitor, a speaker, a separate mobile computing device, etc.

Although FIG. 7 depicts the input device 720 and the presentation device 718 as being local to the computing device that executes the electronic form server system 102, other implementations are possible. For instance, in some embodiments, one or more of the input device 720 and the presentation device 718 can include a remote client-computing device that communicates with the computing system 700 via the network interface device 710 using one or more data networks described herein.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alternatives to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method of applying hierarchical entity data models to input electronic forms to facilitate auto-completion of the input electronic forms, wherein the method includes one or more processing devices performing operations comprising:
  generating, from an input electronic form lacking data values for one or more fields, a schema extraction that identifies (i) a set of input field elements of the input electronic form and (ii) an input category for the set of input field elements;
  accessing a hierarchal entity-data model having (i) an entity category and (ii) entity-data elements within the entity category, wherein the entity category and the entity-data elements are generated in the hierarchal entity-data model by, at least, aggregating a first document structure that is extracted from metadata structure of a completed document and a second document structure that is detected with a trained neural network applied to a document image of the completed document;
  identifying an association between an element of the entity category of the hierarchical entity-data model and the input category of the schema extraction, wherein the association is identified based on one or more of (i) matching text in an entity category label to an input category label and (ii) matching a number of entity-data elements within the entity category to a number of fields input elements of the set of input field elements within the input category;
  verifying, based on identifying the association, that the entity category of the hierarchal entity-data model corresponds to the input category of the schema extraction by applying a natural language processing engine to the input field elements and the entity-data elements; and
  autocompleting one or more of the set of input field elements of the input electronic form with entity data from one or more of the entity-data elements of the hierarchal entity-data model.

2. The method of claim 1, the operations further comprising generating the hierarchical entity-data model by:
  applying a document structure detection network that extracts a set of features from a snapshot image;
  determining a document structure based on the set of features extracted from the snapshot image, wherein the document structure comprises a hierarchical of document categories and document fields;

extracting, from metadata of an electronic document, a metadata structure comprising a hierarchical of metadata categories and metadata fields; and aggregating the metadata structure and the document structure to obtain the entity category and one or more entity-data elements of the hierarchical entity-data model.

3. The method of claim 2, wherein generating the hierarchical entity-data model further comprises:

identifying at least one entity-data element of the hierarchical entity-data model that lacks a data value, and wherein the data value is lacking from the metadata structure and the document structure; and deriving an entity-data value from existing entity-data elements in the hierarchical entity-data model, wherein deriving the entity-data value comprises computing the entity-data value as a function of the existing entity-data elements, wherein the derived entity-data value is different from values of the existing entity-data elements.

4. The method of claim 1, wherein verifying that the entity category corresponds to the input category by applying natural language processing comprises:

translating the input field elements and the entity-data elements into an input word vector and an entity-data word vector, determining a similarity score between the input word vector and the entity-data word vector, wherein the similarity score is determined based on:

computing a distance between the input word vector and the entity-data word vector; or determining a relationship between the input word vector and the entity-data word vector based on semantic analysis.

5. The method of claim 1, wherein verifying that the entity category corresponds to the input category further comprises computing a confidence score based on a quantity of matches between input field elements from the input category and entity-data elements from the entity category or based on the quantity of matches between a plurality of input categories and a plurality of entity categories, wherein the confidence score increases as the quantity of matches increase.

6. The method of claim 1, wherein autocompleting one or more of the input field elements with entity data comprises inserting, based on matching input field element labels and entity-data element labels, the entity data from the one or more entity-data elements into to the one or more input field elements.

7. The method of claim 1, wherein the entity category of the hierarchical entity-data model comprises an additional entity category, wherein the additional entity category comprises (i) a supplemental entity category, or (ii) entity data elements.

8. A system comprising:
a processing device; and
a non-transitory computer-readable medium communicatively coupled to the processing device, wherein the processing device is configured to execute program code stored in the non-transitory computer-readable medium and thereby perform operations comprising:
generating, from an input electronic form lacking data values for one or more fields, a schema extraction that identifies (i) a set of input field elements of the input electronic form and (ii) an input category for the set of input field elements;

accessing a hierarchal entity-data model having (i) an entity category and (ii) entity-data elements within the entity category, wherein the entity category and the entity-data elements are generated in the hierarchal entity-data model by, at least, aggregating a first document structure that is extracted from metadata structure of a completed document and a second document structure that is detected with a trained neural network applied to a document image of the completed document;

identifying an association between an element of the entity category of the hierarchal entity-data model and the input category of the schema extraction, wherein the association is identified based on one or more of (i) matching text in an entity category label to an input category label and (ii) matching a number of entity-data elements within the entity category to a number of input field elements of the set of input field elements within the input category;

verifying, based on identifying the association, that the entity category of the hierarchal entity-data model corresponds to the input category of the schema extraction by applying a natural language processing engine to the input field elements and the entity-data elements; and autocompleting one or more of the set of input field elements of the input electronic form with entity data from one or more of the entity-data elements of the hierarchal entity-data model.

9. The system of claim 8, wherein the hierarchical entity-data model is generated by operations including:

applying a document structure detection network that extracts a set of features from a snapshot image;

determining a document structure based on the set of features extracted from the snapshot image, wherein the document structure comprises a hierarchical of document categories and document fields;

extracting, from metadata of an electronic document, a metadata structure comprising a hierarchical of metadata categories and metadata fields; and aggregating the metadata structure and the document structure to obtain the entity category and one or more entity-data elements of the hierarchical entity-data model.

10. The system of claim 9, wherein the hierarchical entity-data model is generated by operations further comprising:

identifying at least one entity-data element of the hierarchical entity-data model that lacks a data value, and wherein the data value is lacking from the metadata structure and the document structure; and deriving an entity-data value from existing entity-data elements in the hierarchical entity-data model.

11. The system of claim 8, wherein verifying that the entity category corresponds to the input category by applying natural language processing comprises:

translating the input field elements and the entity-data elements into an input word vector and an entity-data word vector, determining a similarity score between the input word vector and the entity-data word vector, wherein the similarity score is determined based on:

computing a distance between the input word vector and the entity-data word vector; or determining a relationship between the input word vector and the entity-data word vector based on semantic analysis.

12. The system of claim 8, wherein verifying that the entity category corresponds to the input category further comprises computing a confidence score based on a quantity of matches between input field elements from the input category and entity-data elements from the entity category or based on the quantity of matches between a plurality of input categories and a plurality of entity categories, wherein the confidence score increases as the quantity of matches increase.

13. The system of claim 8, wherein autocompleting one or more of the input field elements with entity data comprises inserting, based on matching input field element labels and entity-data element labels, the entity data from the one or more entity-data elements into to the one or more input field elements.

14. The system of claim 8, wherein the entity category of the hierarchical entity-data model comprises an additional entity category, wherein the additional entity category comprises (i) a supplemental entity category, or (ii) entity data elements.

15. A non-transitory computer-readable medium having program code that is stored thereon, the program code executable by one or more processing devices for performing operations comprising:
generating, from an input electronic form lacking data values for one or more fields, a schema extraction that identifies (i) a set of input field elements of the input electronic form and (ii) an input category for the set of input field elements;
accessing a hierarchal entity-data model having (i) an entity category and (ii) entity-data elements within the entity category, wherein the entity category and the entity-data elements are generated in the hierarchal entity-data model by, at least, aggregating a first document structure that is extracted from metadata structure of a completed document and a second document structure that is detected with a trained neural network applied to a document image of the completed document;
identifying an association between an element of the entity category of the hierarchal entity-data model and the input category of the schema extraction, wherein the association is identified based on one or more of (i) matching text in an entity category label to an input category label and (ii) matching a number of entity-data elements within the entity category to a number of input field elements of the set of input field elements within the input category;
verifying, based on identifying the association, that the entity category of the hierarchal entity-data model corresponds to the input category of the schema extraction by applying a natural language processing engine to the input field elements and the entity-data elements; and
autocompleting one or more of the set of input field elements of the input electronic form with entity data from one or more of the entity-data elements of the hierarchal entity-data model.

16. The non-transitory computer-readable medium of claim 15, the operations further comprising generating the hierarchical entity-data model by:
applying a document structure detection network that extracts a set of features from a snapshot image;
determining a document structure based on the set of features extracted from the snapshot image, wherein the document structure comprises a hierarchical of document categories and document fields;
extracting, from metadata of an electronic document, a metadata structure comprising a hierarchical of metadata categories and metadata fields; and
aggregating the metadata structure and the document structure to obtain the entity category and one or more entity-data elements of the hierarchical entity-data model.

17. The non-transitory computer-readable medium of claim 16, wherein generating the hierarchical entity-data model further comprises:
identifying at least one entity-data element of the hierarchical entity-data model that lacks a data value, and wherein the data value is lacking from the metadata structure and the document structure; and
deriving an entity-data value from existing entity-data elements in the hierarchical entity-data model.

18. The non-transitory computer-readable medium of claim 15, wherein verifying that the entity category corresponds to the input category by applying natural language processing comprises:
translating the input field elements and the entity-data elements into an input word vector and an entity-data word vector,
determining a similarity score between the input word vector and the entity-data word vector, wherein the similarity score is determined based on:
computing a distance between the input word vector and the entity-data word vector; or
determining a relationship between the input word vector and the entity-data word vector based on semantic analysis.

19. The non-transitory computer-readable medium of claim 15, wherein verifying that the entity category corresponds to the input category further comprises computing a confidence score based on a quantity of matches between input field elements from the input category and entity-data elements from the entity category or based on the quantity of matches between a plurality of input categories and a plurality of entity categories, wherein the confidence score increases as the quantity of matches increase.

20. The non-transitory computer-readable medium of claim 15, wherein autocompleting one or more of the input field elements with entity data comprises inserting, based on matching input field element labels and entity-data element labels, the entity data from the one or more entity-data elements into to the one or more input field elements.

* * * * *